US012011791B2

(12) United States Patent
Toro

(10) Patent No.: US 12,011,791 B2
(45) Date of Patent: Jun. 18, 2024

(54) ORIENTATION DEVICE FOR ELONGATED OBJECTS

(71) Applicant: SYSTEM CERAMICS S.P.A., Fiorano Modenese (IT)

(72) Inventor: Andrea Toro, Fiorano Modenese (IT)

(73) Assignee: SYSTEM CERAMICS S.P.A., Modenese (IT)

( * ) Notice: Subject to any disclaimer, the term of this patent is extended or adjusted under 35 U.S.C. 154(b) by 652 days.

(21) Appl. No.: 17/277,339

(22) PCT Filed: Sep. 18, 2019

(86) PCT No.: PCT/IB2019/057846
§ 371 (c)(1),
(2) Date: Mar. 18, 2021

(87) PCT Pub. No.: WO2020/058863
PCT Pub. Date: Mar. 26, 2020

(65) Prior Publication Data
US 2022/0023980 A1 Jan. 27, 2022

(30) Foreign Application Priority Data
Sep. 21, 2018 (IT) .................. 102018000008814

(51) Int. Cl.
*B23P 19/00* (2006.01)
*B65G 47/14* (2006.01)
*B65G 47/24* (2006.01)
(52) U.S. Cl.
CPC ........... *B23P 19/002* (2013.01); *B23P 19/007* (2013.01); *B65G 47/1485* (2013.01); *B65G 47/24* (2013.01); *B65G 2201/0217* (2013.01)

(58) Field of Classification Search
None
See application file for complete search history.

(56) References Cited

U.S. PATENT DOCUMENTS 2,733,824 A * 2/1956 Ruppe ................... H01F 7/0257
414/610
2007/0158163 A1 7/2007 Kritzinger et al.

FOREIGN PATENT DOCUMENTS

DE 102010007239 A1 9/2010
EP 1980341 A1 * 10/2008 ........... B21D 43/285
(Continued)

OTHER PUBLICATIONS

Indian Office action dated Jun. 9, 2022, 5 pages.
(Continued)

*Primary Examiner* — William R Harp
(74) *Attorney, Agent, or Firm* — Pearne & Gordon LLP; J. Gregory Chrisman

(57) ABSTRACT

An orientation device for objects (O) provided with a stem (S) and with a head (H) that has a minimum width (R), characterised in that it comprises: a slot (3) which has two edges separated by a predetermined distance (D), less than the minimum width (R) and greater than the maximum width of the stem (G); an uncoupling device (4), movable between an active configuration, in which it is able to retain an object (O) with respect to lifting, and an inactive configuration, in which it is not able to interact with an object (O); a magnetic gripping element (2), movable along at least a vertical direction between an upper position and a lower position, in which an object (O) associated with the gripping element (2) is in a position such as to be retained by the uncoupling device (4) so as to be detached from the gripping element (2).

12 Claims, 12 Drawing Sheets

(56) References Cited

FOREIGN PATENT DOCUMENTS

| | | |
|---|---|---|
| JP | S58223539 A | 12/1983 |
| JP | H0848426 A | 2/1996 |
| JP | 2007091392 A | 4/2007 |
| JP | 2016007651 A | 1/2016 |
| JP | 2016166090 A | 9/2016 |
| JP | 2018047520 A | 3/2018 |

OTHER PUBLICATIONS

Brazilian Office action (Technical Report), dated Jun. 8, 2023, 4 pages.
Database WPI Week 201663 Thomson Scientific, London, GB; AN 2016-57704K XP002791386; JP 2016 166090 A, Sep. 15, 2016, pp. 1-2.
Database WPI Week 200741 Thomson Scientific, London GB; AN 2007-427103 XP002791387; JP 2007 091392 A, Apr. 12, 2007, pp. 1-2.
Database WPI Week 201608 Thomson Scientific, London GB; AN 2016-051665 XP002791388; JP 2016 007651 A, Jan. 18, 2016, pp. 1-2.

\* cited by examiner

ORIENTATION DEVICE FOR ELONGATED OBJECTS

The present invention relates to an orientation device for elongated objects provided with a head, for example an end head. The orientation device according to the present invention is particularly useful for orienting screws, nails or other similar objects.

BACKGROUND OF THE INVENTION

Several types of orientation devices are currently available that generally have the function of orienting an object in space, so that the same can be supplied or removed from a tool in the desired position.

The orientation devices currently available comprise a container of large dimensions which contains the objects to be oriented, in bulk. The container is provided with vibrating means and orientation surfaces with various shapes and arrangements. The vibrating means transmits a vibratory motion to the container and the objects contained therein, the vibratory motion is guided by the orientation surfaces and tends to move the objects along a predetermined path up to orienting them in the desired manner.

As is known, such orientation devices are very expensive and bulky. For this reason, an industrial plant generally employs one or few orientation devices, located in fixed positions. This also requires the provision of systems for transporting the oriented objects. These transport systems are typically pneumatic and are rather complex and expensive. A further drawback of the current orientation devices is given by their very low efficiency, intended as the rather long amount of time required for the correct orientation of an object.

SUMMARY OF THE INVENTION

The object of the present invention is to provide an orientation device which allows the limitations of the current devices to be overcome.

An advantage of the orientation device according to the present invention is that it is considerably compact and lightweight, so that it can be installed near a tool to which the oriented objects must be supplied.

Another advantage of the orientation device according to the present invention is given by its remarkable effectiveness, which allows orienting an object in a very short amount of time.

BRIEF DESCRIPTION OF THE FIGURES

Further characteristics and advantages of the present invention will become more apparent in the following detailed description of an embodiment of the present invention, illustrated by way of non-limiting example in the attached figures, wherein.

DETAILED DESCRIPTION OF THE INVENTION

Figure 1:
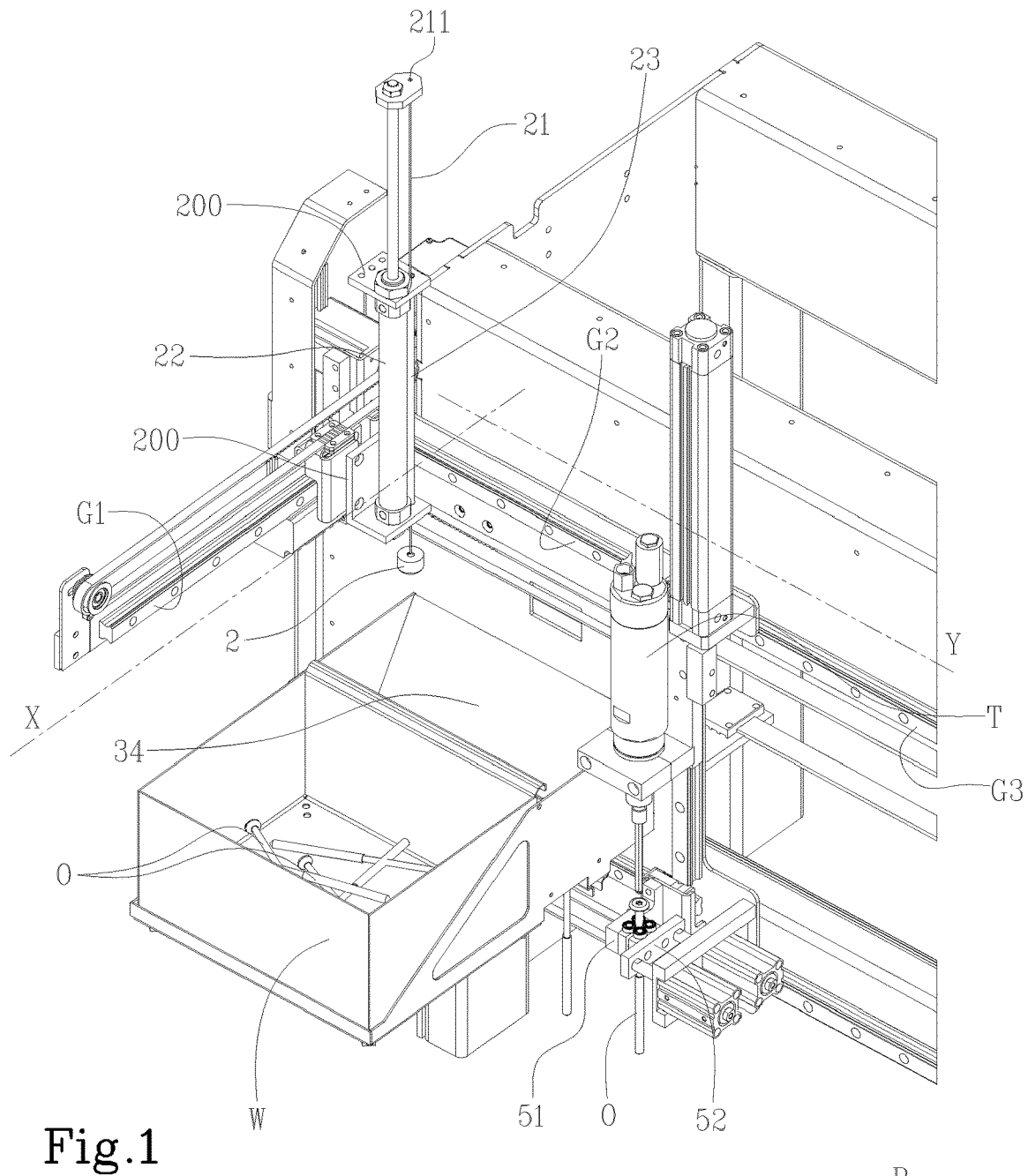
FIGS. 1 to 6 show some operating steps of the orientation device according to the present invention, in isometric view.
Figure 1A:
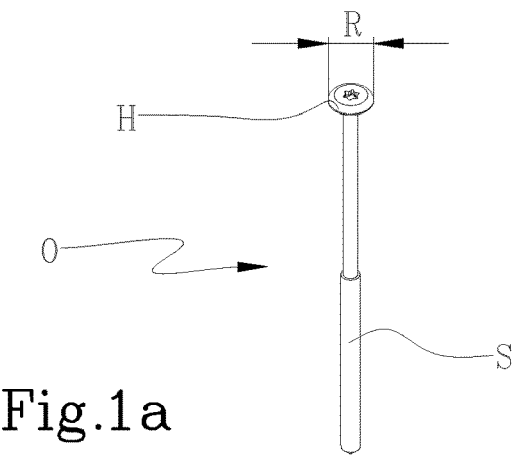
FIG. 1a shows an object which can be oriented with the device according to the present invention.
Figure 2:
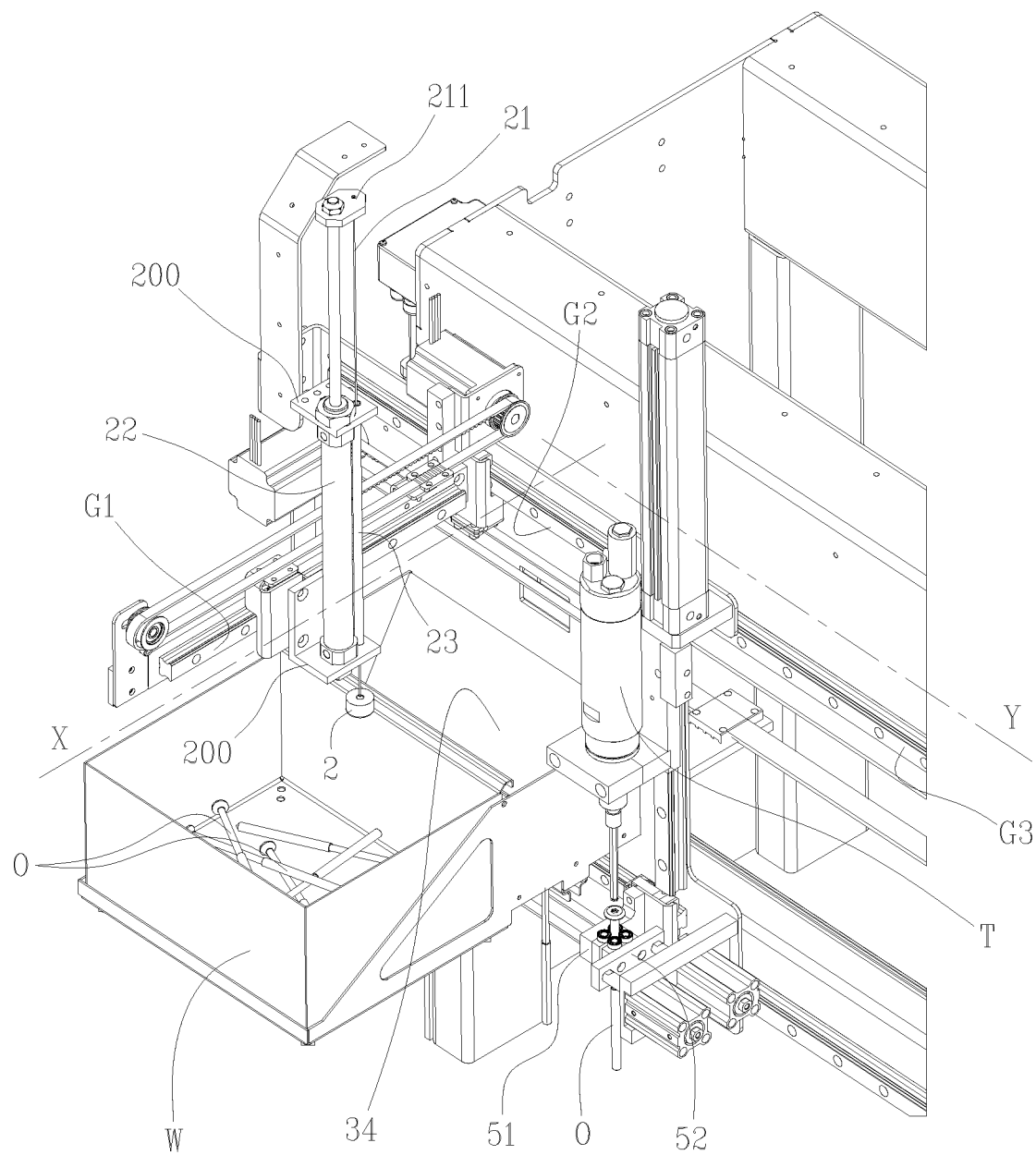

The orientation device according to the present invention is particularly, but not exclusively, useful for orienting objects (O) of elongated shape, provided with a stem (S) and a head (H), located in an end or intermediate position, that has a maximum width (R). For example, the device can be used to orient screws and nails. In this case, the head (H) of an object (O) is constituted by the head of the screw or nail. If the head is round, the maximum width (R) is defined by the diameter, while if the head is hexagonal, the minimum width is defined by the distance between two sides.

The device according to the present invention comprises a slot (3) which has two edges (31,32) separated by a predetermined distance (D), less than the maximum width (R) of the head (H) and greater than the maximum width of the stem (S). As will be better explained in the following description, the slot (3) is shaped to retain the head (H), or to prevent being crossed by the head (H), and to allow the passage of the stem (S). In this way, an object (O) resting on the slot (3) is oriented with the stem (S) vertical and the head (H) facing upwards, resting on the edges of the slot (3). In fact, due to the effect of gravity, the stem (S) moves downwards passing through the slot (3) and making the object (S) rotate about the head (H), which instead remains resting on the edges of the slot (3).

In one possible but non-exclusive embodiment illustrated in the figures, the slot (3) is delimited by a pair of walls (34,35) converging to each other in the downwards direction. In a lower portion, the two walls (34,35) define two opposite edges (31,32) of the slot (3). Preferably, the two walls (34,35) have a bottom portion at which a step is provided which is bent towards the opposite wall. These steps substantially define the opposite edges (31,32) of the slot (3). The convergent arrangement of the walls (34,35) favours the channeling and the descent of the objects (O) towards the slot (3). Preferably, but not necessarily, the two walls (34,35) are substantially parallel in a lower zone and are separated in this zone by a distance slightly greater than the minimum width (R) of the head (H). This induces the objects (S) to be arranged with the stem (S) substantially parallel to the slot (3), i.e. in a position in which the stem (S) can pass through the slot (3).

The slot (3) is preferably straight and extends along a longitudinal direction (Y). The edges (31,32) are parallel to the longitudinal direction (Y).

It is possible to provide the orientation device with an adjustment mechanism to allow adjusting the distance (D) between the edges (31,32) of the slot (3), i.e. to allow adjusting the width (D) of the slot (3). For example, this adjustment mechanism is structured so as to vary the distance between the edges (31,32) of the slot (3), or to vary the distance between the walls (34,35).

The orientation device according to the present invention further comprises a magnetic gripping element (2), movable along at least one vertical direction between an upper position and a lower position. In the lower position, an object (O) associated with the gripping element (2) is located above the slot (3), near the same.

The gripping element (2), for example, comprises a permanent magnet. Alternatively the gripping element can comprise an electromagnet.

The orientation device further comprises an uncoupling device (4), predisposed for retaining an object (O) with respect to a lifting movement. The uncoupling device (4) is movable between an active configuration, in which it is able to retain an object (O) with respect to lifting, i.e. with respect to a displacement directed upwards, and an inactive configuration, in which it is not able to interact with an object (O). By retaining the object (O) with the uncoupling device (4) and lifting the gripping element (2), it is possible to detach the object (O) from the gripping element (2). Upon detaching from the gripping element (2), the object (O) is arranged resting on the slot (3), that is on the edges (31,32) of the slot (3).

Figure 3:
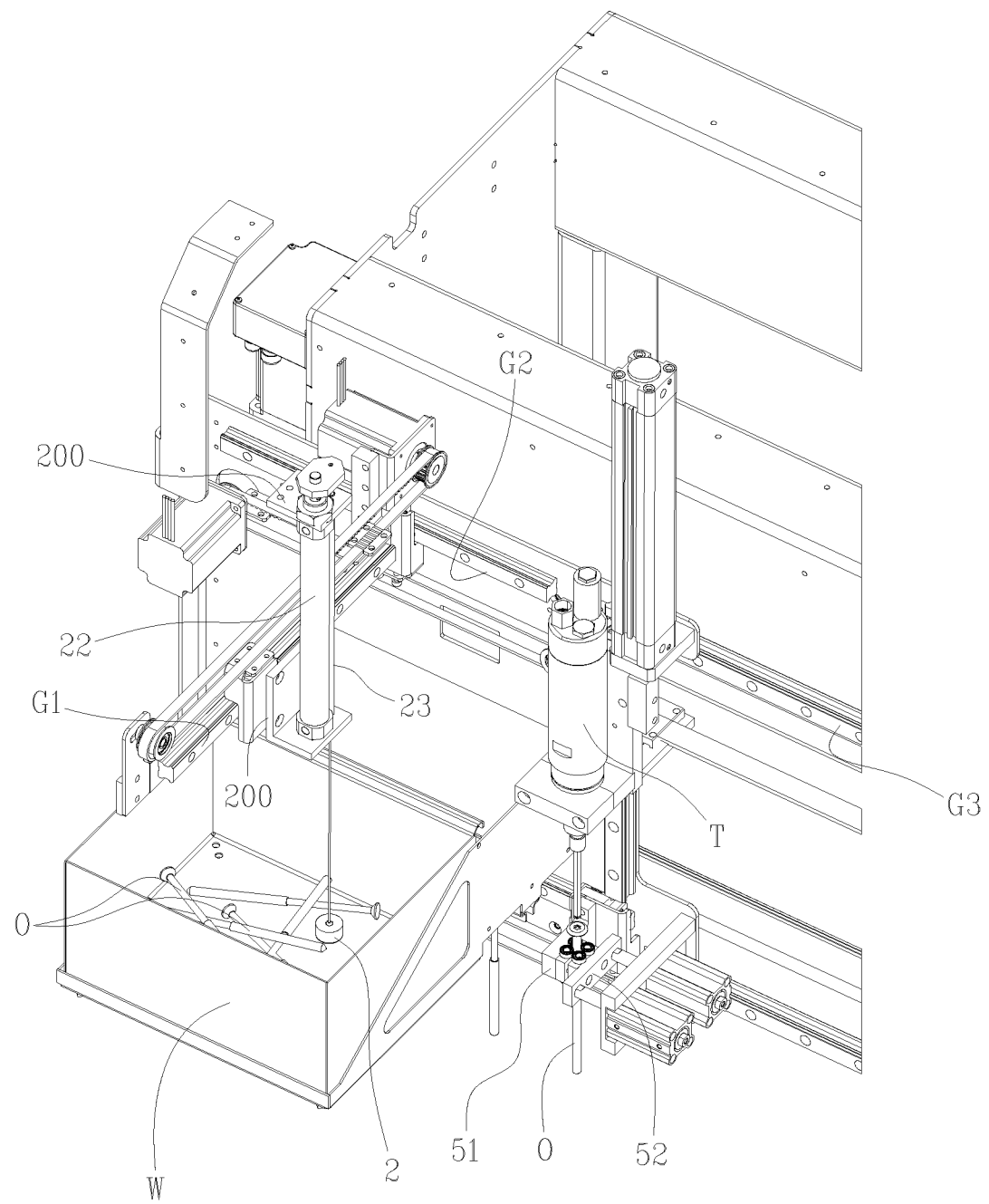
Figure 4:
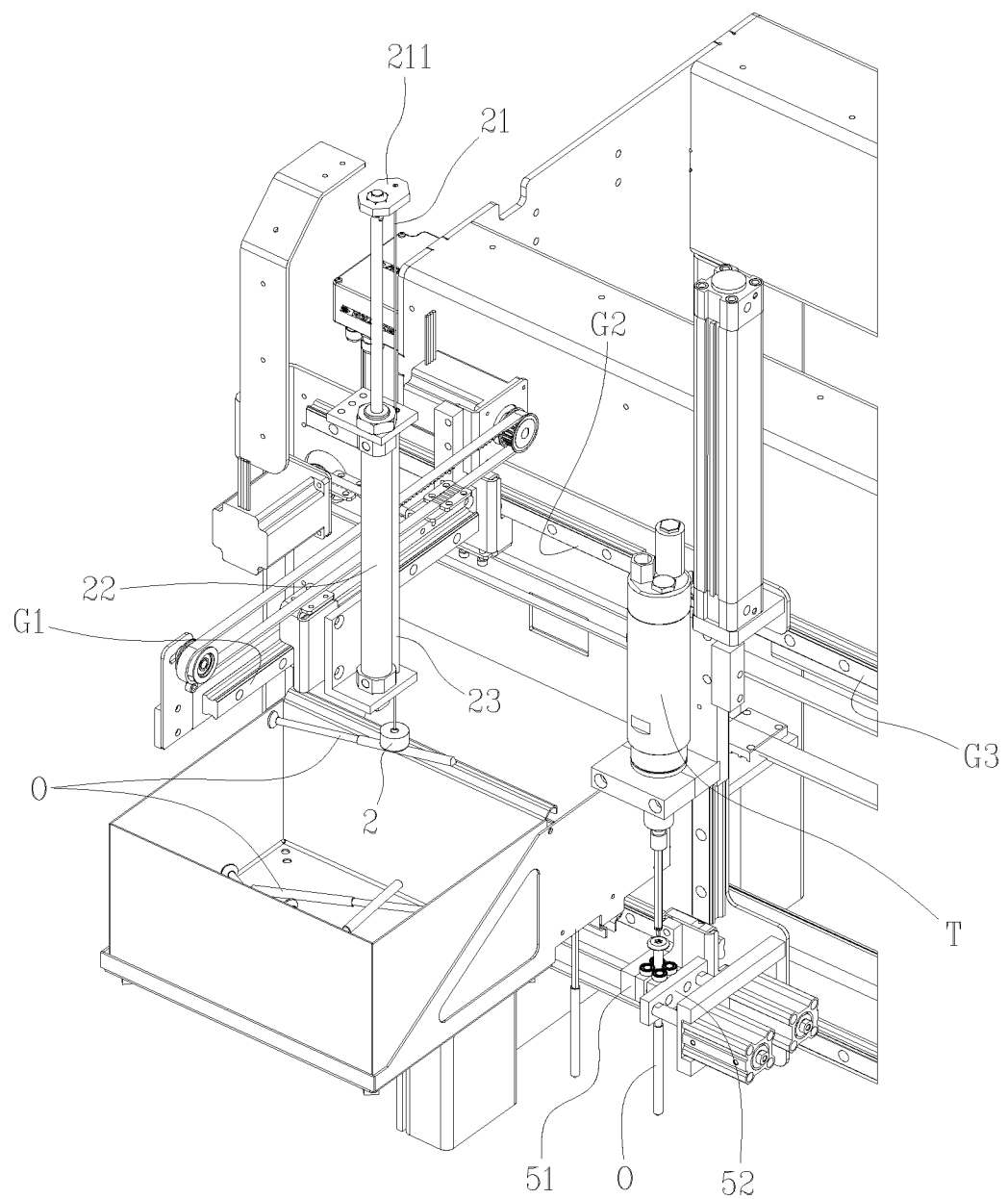
Figure 5:
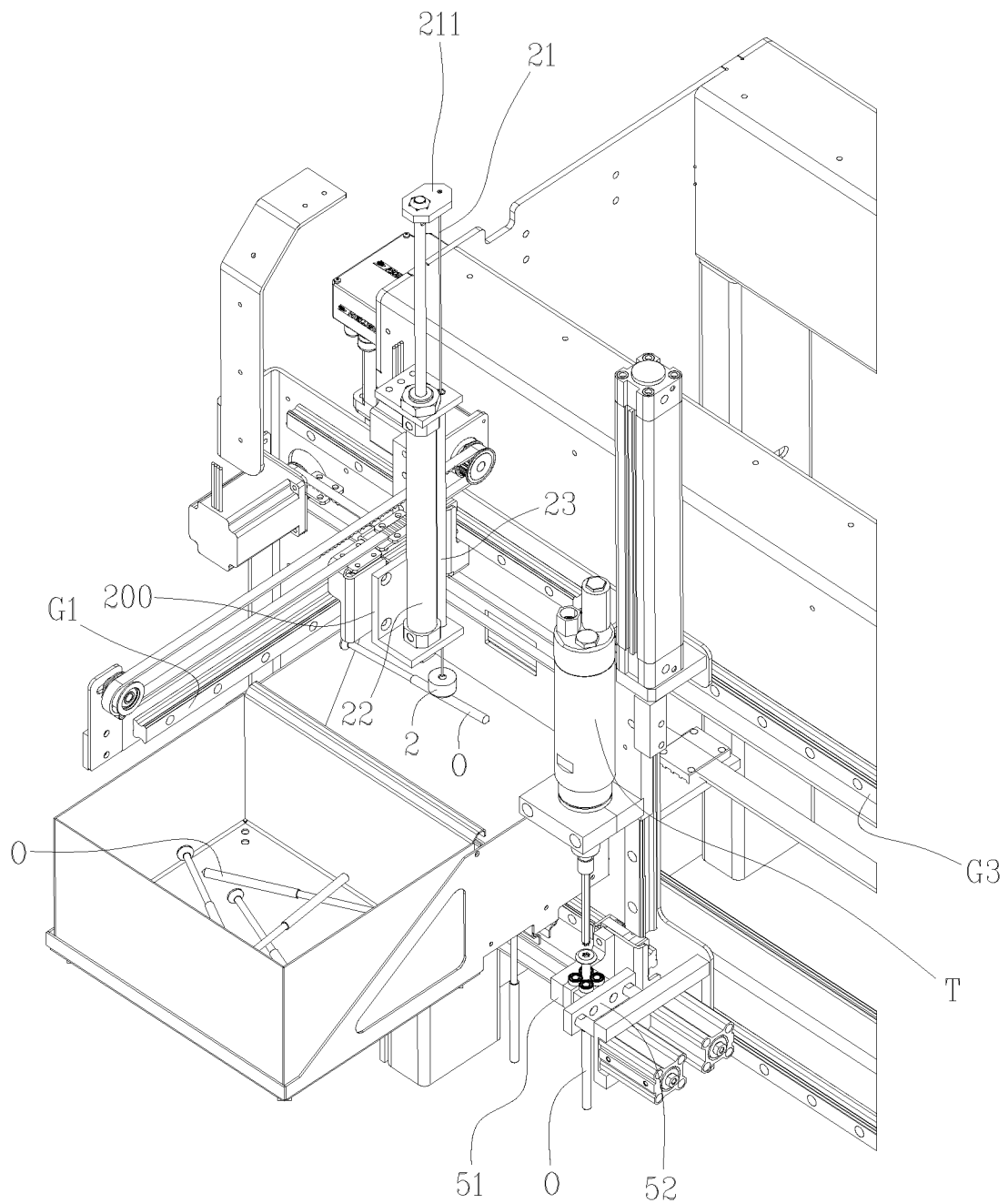
Figure 6:
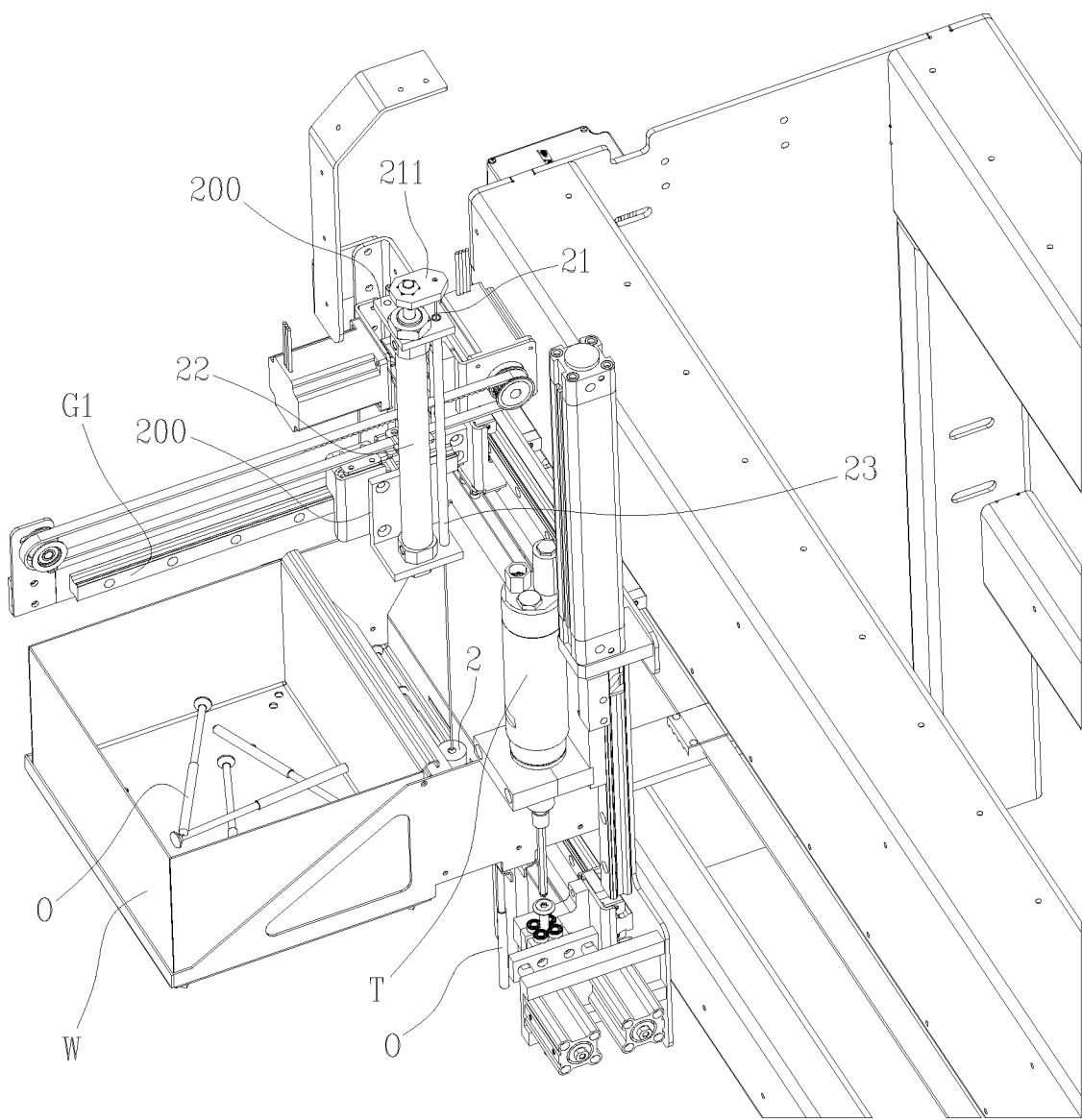
Figure 12:
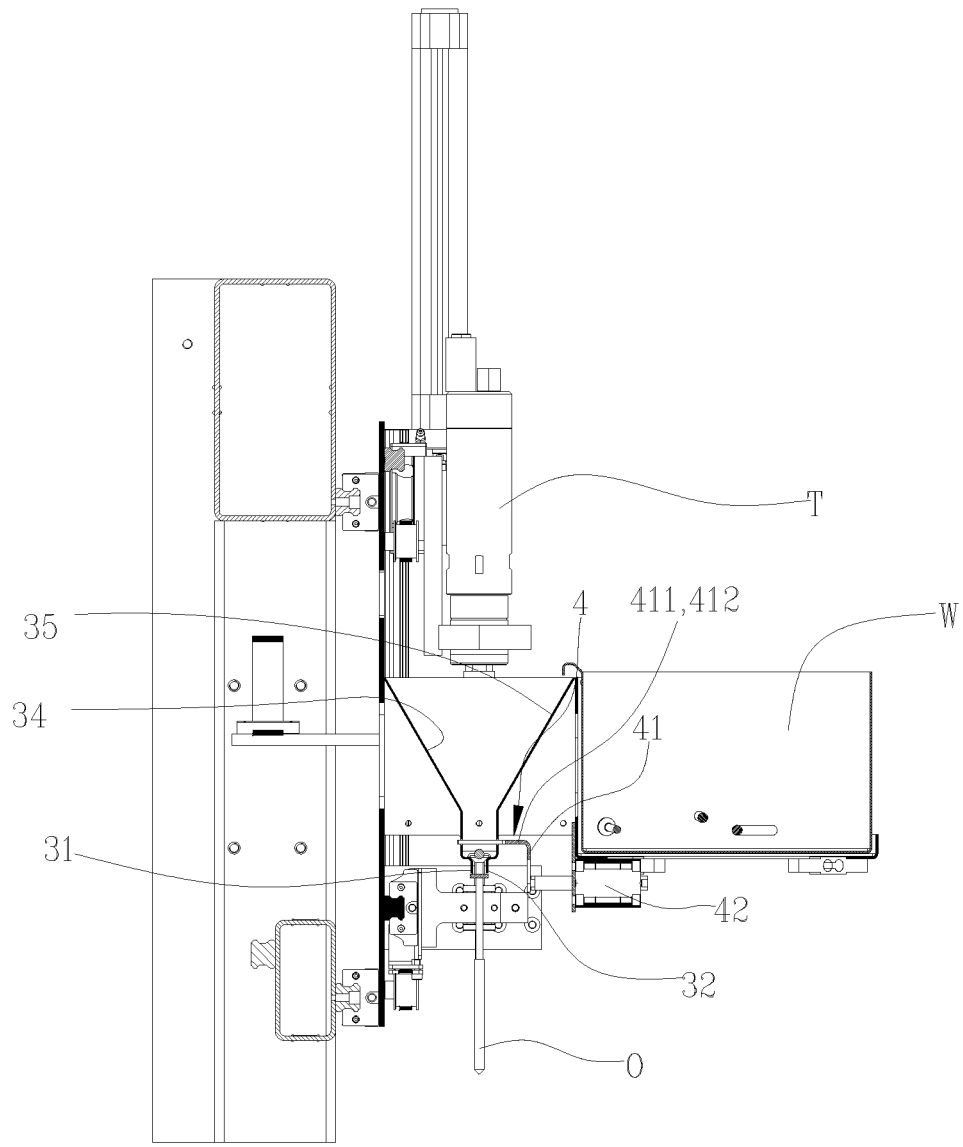

The cycle of operation of the orientation device is particularly simple and effective. Starting from an initial position in which an object (O) is collected by the gripping element (2) (FIG. 3), the object (O) is transported above the slot (3) by means of the gripping element (2) (FIG. 5). The gripping element (2) is then lowered towards the lower position (FIG. 6), in which the uncoupling device (4) is activated (FIG. 12). From this condition, lifting, the gripping element (2) carries the object (O) to interfere with the uncoupling device. The object (O) is detached from the gripping element (2) and is therefore free to orientate itself vertically, rotating about the head (H), arranged resting on the edges (31,32) of the slot (3), due to the effect of the descent of the stem (S) through the slot (3).

To facilitate the coupling and uncoupling of the objects, (O), the gripping element (2) is hanging from a vertically sliding flexible element (21). In the preferred but non-exclusive embodiment shown, the flexible element (21) is in the form of a cable or wire, which can be made of steel or other metal or plastic materials. The use of a flexible element (21) to support the gripping element (2) offers the advantage for which the gripping element (2) can tilt to adapt to an inclined position of the object (O) to be collected, so as to constantly ensure effective coupling. It would also be possible to use a non-flexible supporting element for the gripping element (2), for example a rod or an arm shaped in a manner suitable for the purpose.

In the embodiment shown, the flexible element (21) can slide vertically due to the operation of an actuator (22) associated with one end (211) of the flexible element. The actuator (22), for example, is in the form of a pneumatic or hydraulic cylinder. One end of the actuator (22) is associated with the end (211) of the flexible element (21), while the other end of the flexible element (21) is associated with the gripping element (2). The actuator (22) can be arranged vertically, as in the embodiment shown, or can be oriented in any other way. In the embodiment shown the actuator (22) and the flexible element (21) are parallel to each other. The flexible element (21), at least for an intermediate portion, is slidable in a tubular guide (23) that allows limiting the oscillations.

The gripping element (2) is movable at least along a horizontal direction (X). This direction (X) is substantially transverse to the longitudinal direction (Y). The gripping element (2) is movable along the horizontal direction (2) between a first position, in which it is vertically located above the slot (3), or anyway within the projection in plan view of the walls (34,35) which converge towards the slot (3), and a second position in which it is moved laterally with respect to the slot (3). In the second position, the gripping element (2) is able to couple with an object (O) to be aligned. The orientation device can be provided with a storage (W), inside which the objects (O) can be arranged in bulk. The storage (W) is for example in the form of a box open at the top. In the second position, the gripping element (2), descending, encounters the objects (O) inside the storage (W), and couples to one of them. Subsequently, the gripping element (2) rises and translates along the horizontal direction (X), returning above the slot (3). In this position the gripping element (2) is lowered towards the lower position, in which the uncoupling device (4), when activated, prevents the object (O) from rising. At this point the gripping element (2) rises towards the upper position, detaching from the object (O) which remains blocked thanks to the uncoupling device (4). The object (O) is freed and is arranged resting on the slot (3), rotating about the head (H) that rests on the edges (31,32) of the slot (3) and is arranged with the stem (S) through the slot (3) in vertical position.

The storage (W) is preferably integral with the slot (3), so as to move integrally with the latter. Alternatively, the storage (W) could be separate from the slot (3), and be in a position which is predetermined according to need.

Preferably, the gripping element (2) is also movable along the longitudinal direction (Y), for greater freedom of movement both in the second position, i.e. for the collection of the objects (O) to be oriented, and in the first position, to be able to release the objects (O) in different positions along the slot (3).

Figure 7:
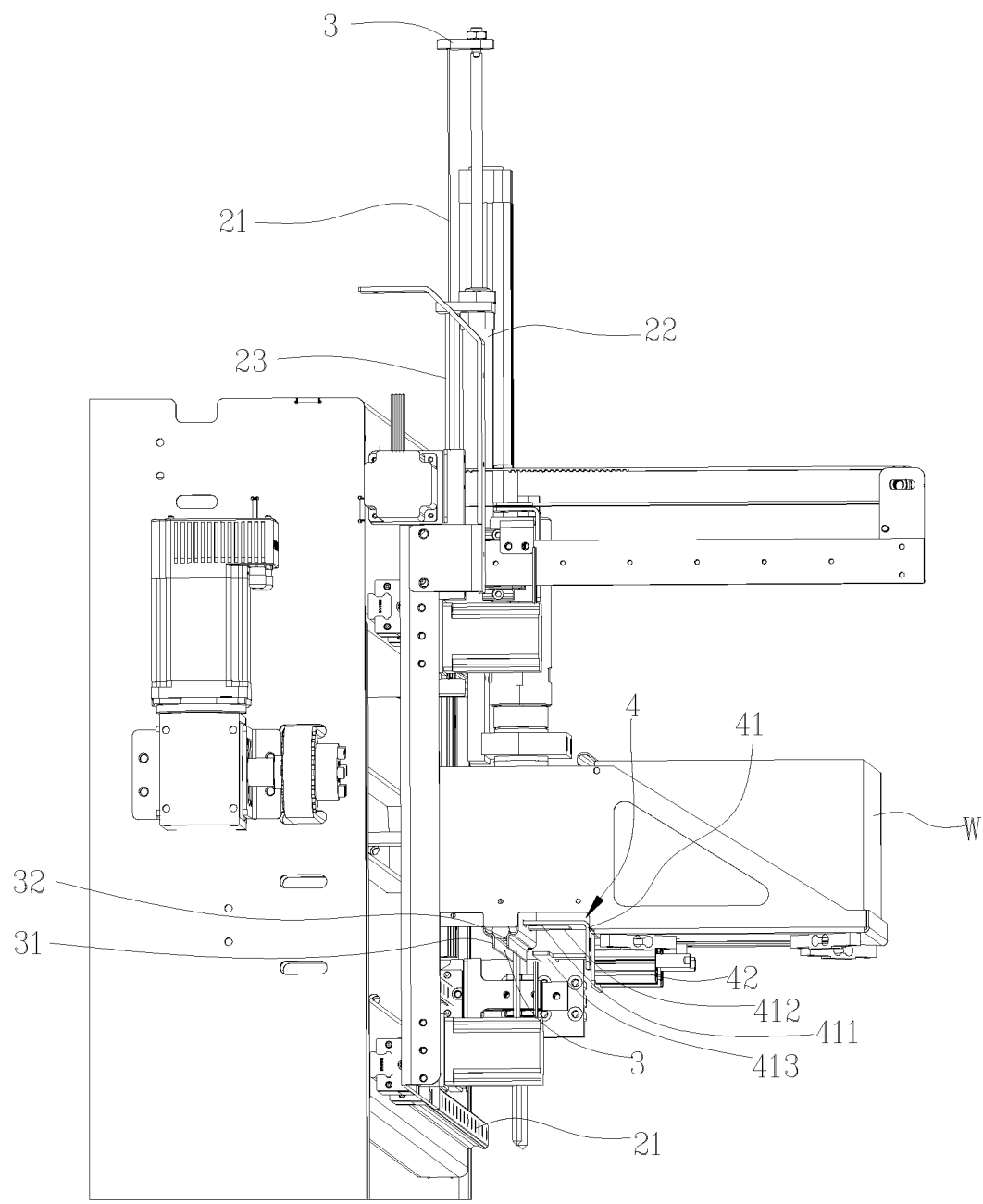
FIGS. 7 to 10 show some of the operating steps of FIGS. 1 to 6, from a different viewpoint.
Figure 8:
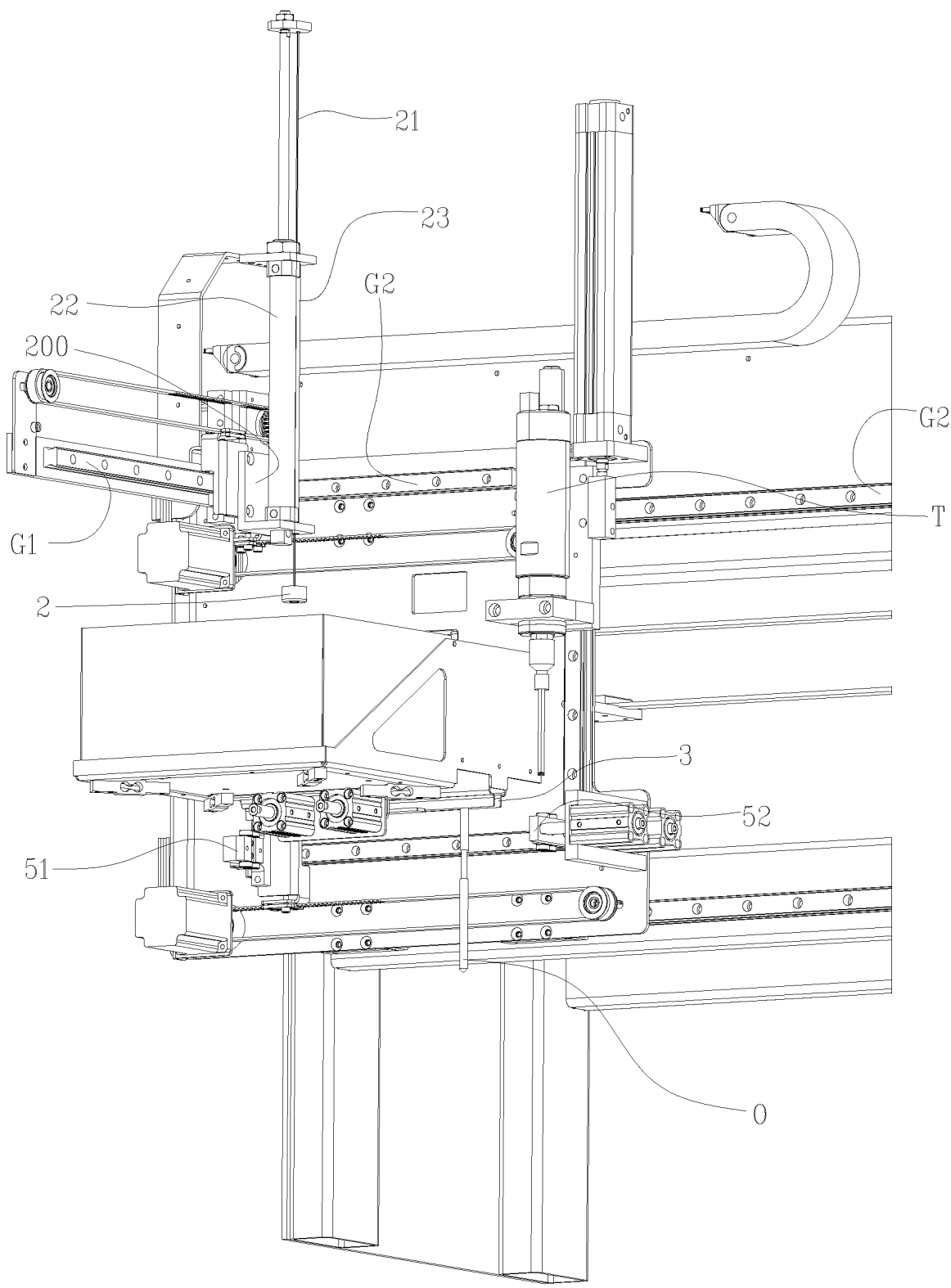
Figure 9:
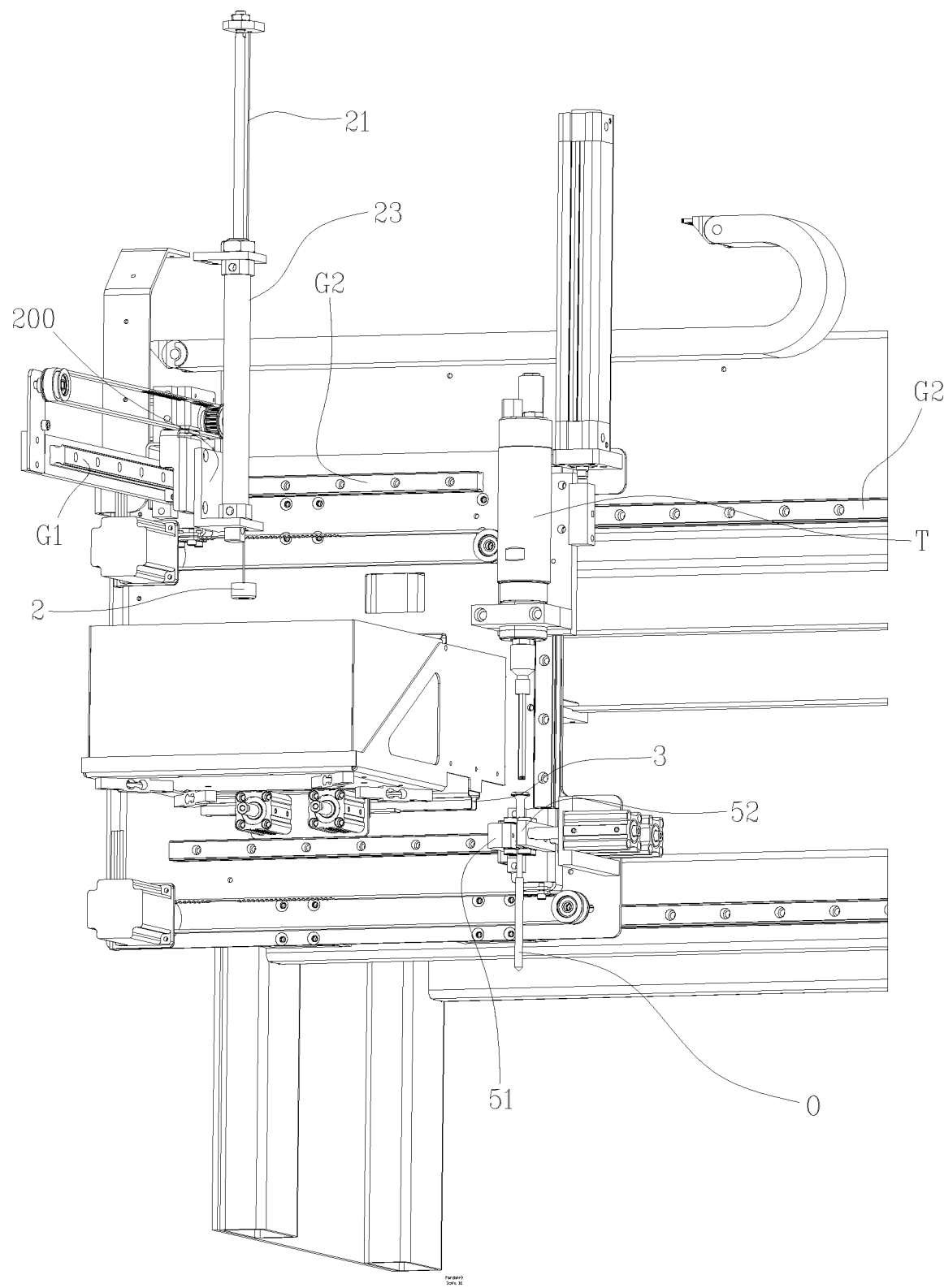
Figure 10:
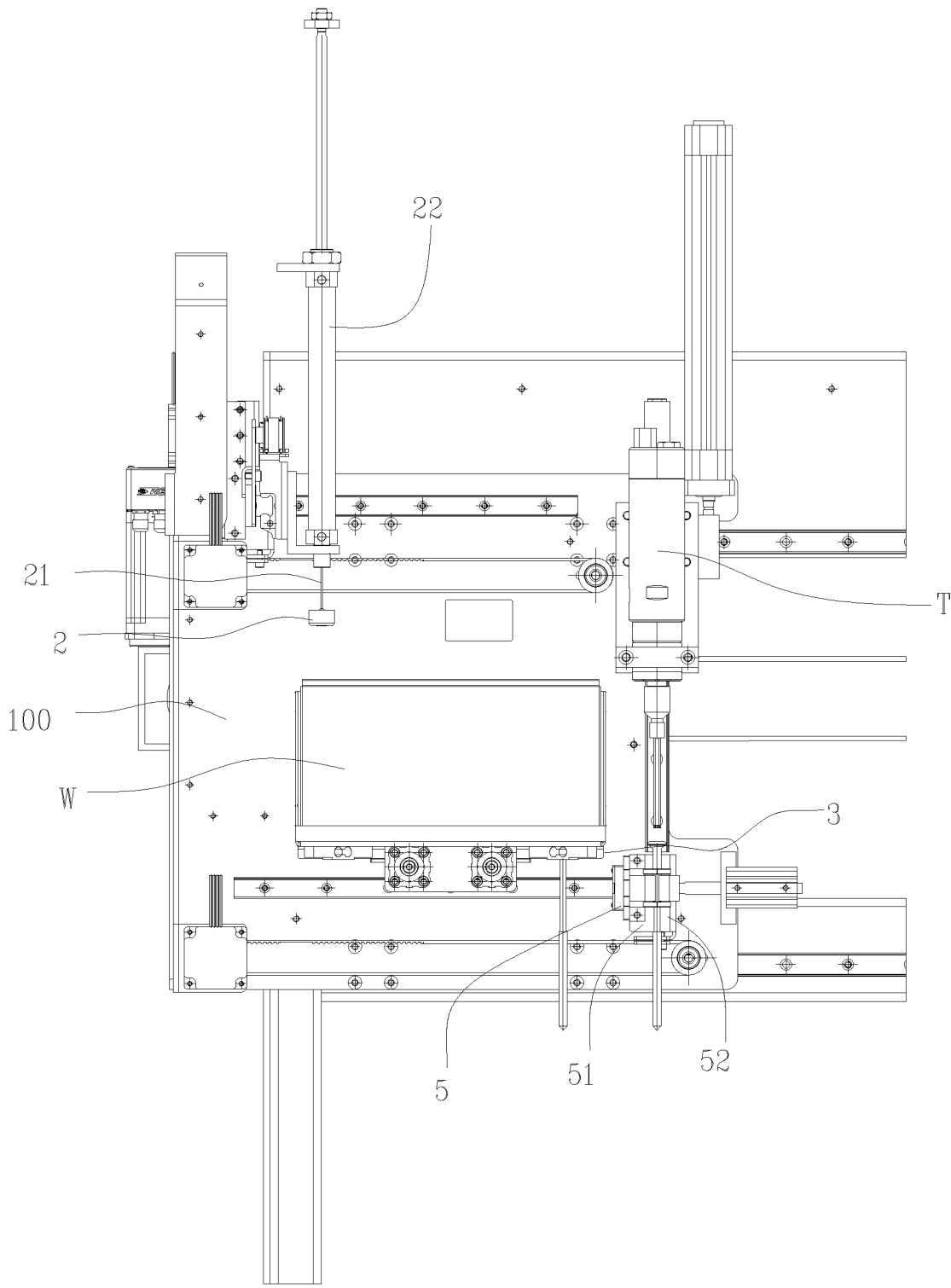
Figure 11:
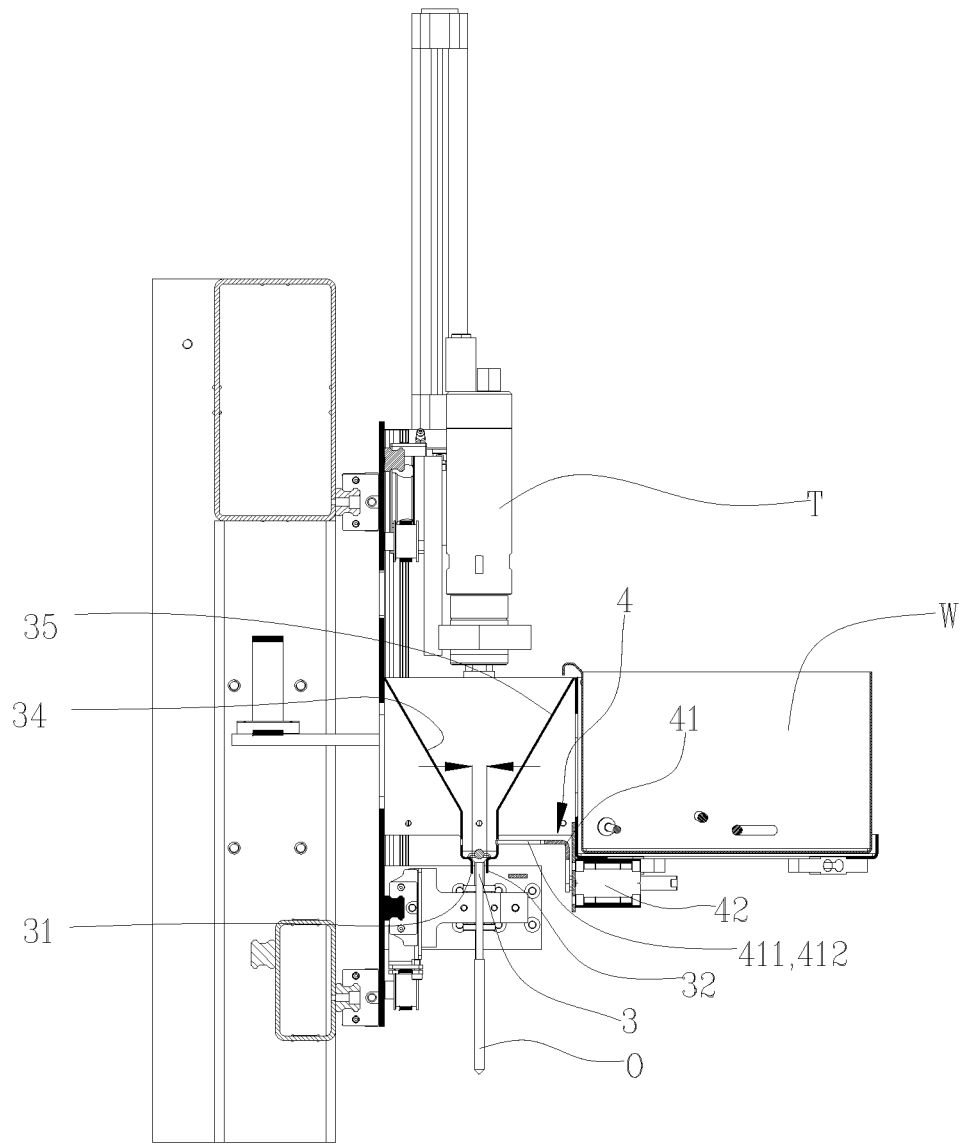
FIGS. 11 and 12 show two operating steps of the device in a sectional view, shown on a plane perpendicular to the direction Y of FIGS. 1 and 2.

In one possible embodiment illustrated in the figures, the uncoupling device (4) comprises a slider (41), predisposed to retain an object (O) with respect to a vertical lifting movement (FIG. 7). In particular, the slider (41) is movable between an inactive position, in which it does not interfere with an object (O) positioned on the slot (3) (FIG. 11), and an active position (FIG. 12), in which it is able to interfere with an object (O) disposed above the slot (3), in the lower position of the gripping element (2). An actuator (42) is associated with the slider (41) to allow the translation between the active position and the inactive position. The actuator (42) comprises for example a pneumatic or hydraulic cylinder.

In substance, when the gripping element (2) is located in the lower position with an object (O) coupled and the slider (41) is located in the active position, a lifting of the gripping element (2) towards the upper position brings about an interference between the object (O) and the slider (41), which retains the object (O) with respect to the lifting and causes its detachment from the gripping element (2).

In the embodiment represented, the slider (41) comprises a pair of arms (411,412) parallel and coplanar to each other. The two arms (411,412) are separated by a distance less than the length of the objects (O) and greater than the width of the gripping element (2). In the active position, the two arms (411,412) are arranged above the slot (3), astride of the gripping element (2), so as to allow the lifting thereof and so as to prevent the lifting of the object (O). The two arms (411,412) are movable through a through opening formed in a wall (35) of the slot (3).

The slider (41) preferably comprises a third arm (413), arranged in an intermediate position and at a lower height with respect to the other two arms (411,412). The third arm (413), in the active position, is positioned below the slot (3), near a lower edge of the latter. The third arm (413), intermediate to the two parallel arms (411,412), is predisposed to intervene in the case in which an object (O), in the lower position of the gripping element (2), is located in an orientation which is very inclined towards the vertical or substantially vertical, for example because it is attached to the gripping element (2) at the head (H). In this case, the stem (G) protrudes below the slot (3), while the head (H) is attached to the gripping element (2). The third arm (413), in the active position of the slider (41) presses the stem (G) in contact with an edge (31) of the slot (3), preventing the lifting of the object (O), which may otherwise pass between the two arms (411,412).

Preferably, the arms (411,412,413) are in the form of plates that have a predetermined width along the longitudinal direction (Y), so as to ensure an effective interaction with the objects (O).

In the embodiment shown, the gripping element (2) is associated with a support structure (200) which is associated with a pair of guides (G1,G2) respectively parallel to the horizontal direction (X) and to the longitudinal direction (Y). These guides (G1,G2) comprise for example motorised belts, perfectly known to those skilled in the art. Other solutions would also be possible for the movement of the support structure (200), all within the reach of a person skilled in the art.

The actuator (22), the flexible element (21) and the tubular guide (23) are also constrained to the support structure (200).

The orientation device according to the invention can also be provided with a translator (5), predisposed to translate an object (O) oriented along the slot (3) and for translating the object (O) from the slot (3) towards an operating position, in which the object (O) can be used by a tool (T).

The translator (5) comprises a first slider (51), located beneath the slot (3) and movable along the longitudinal direction (Y). The first slider (51) is positioned so as to be able to come into contact with the stem (G) of an object (O) oriented vertically through the slot (3). The first slider (51) is arranged to perform a stroke that substantially extends between a first end and a second end, where the second end is located substantially beyond one end of the slot (3). In the stroke from the first to the second end, the first slider (51) encounters the stem (G) of the object (O) oriented vertically through the slot (3), and pushes the object (G) forwards along the slot (3) up to removing it from the slot (3). Exiting from the slot (3), the object (O) exposes its head (H) upwards, becoming available to a tool (T). The tool (T) can be for example a screwdriver, in the case of objects (O) in the form of screws, or a clincher, in the case of objects (O) in the form of nails, or other. The illustrated embodiment shows objects (O) in the form of screws and a tool (T) in the form of a screwdriver.

In the embodiment shown, the translator (5) comprises an abutment (52) opposite to the slider (51). The slider (51), at the second end of its stroke, pushes the object (O) in contact with the abutment (52). In substance, in the operating position, in which it is available for the tool (T), the object (O) is held between the slider (51) and the abutment (52), so as to be firmly retained in the vertical orientation. In the case shown, in which the object (O) is in the form of a screw, the slider (51) and the abutment (52) are provided with revolving elements, for example bearings, which are in contact with the object (O). In this way the object (O) is free to rotate about its own longitudinal axis under the action of the tool (T).

Advantageously the orientation device according to the present invention is supported as a unitary block by a frame (100), for example in the form of a plate. In particular, all of the components described so far are associated with the frame (100), directly or indirectly, as shown in the appended figures. The tool (T) can also be associated with the frame (100), so as to be integral with the orientation device. The frame (100) can be moved in space, to place the tool (T) in one or more desired working positions. For example, the tool (T), together with the orientation device, can be placed in different operating positions in which the screwing of a screw is envisaged, for example to fix two parts together. In the embodiment shown, the frame (100) is movable along the longitudinal direction (Y) by means of one or two guides (G3), parallel to the longitudinal direction (Y). The guides (G3) and the means for allowing the translation of the frame (100) are not described in further detail, as these components are known to a person skilled in the art.

The invention claimed is:

1. An orientation device for objects (O) provided with a stem (S) and with a head (H) that has a minimum width (R), wherein the orientation device comprises: a slot (3) which has two edges (31,32) separated by a predetermined distance (D), less than the maximum width (R) of the head (H) and greater than the maximum width of the stem (S); an uncoupling device (4), movable between an active configuration, in which the uncoupling device is able to retain an object (O) with respect to lifting, and an inactive configuration, in which the coupling device is not able to interact with an object (O); a magnetic gripping element (2), movable along at least a vertical direction between an upper position and a lower position, in which an object (O) associated with the gripping element (2) is in a position such as to be retained by the uncoupling device (4) so as to be detached from the gripping element (2) and resting on the slot (3).

2. The device according to claim 1, wherein the uncoupling device (4) comprises a slider (41), predisposed to press an object (O) in contact with an edge (31) of the slot (3).

3. The device according to claim 2, wherein the slider (41) comprises a pair of arms (411,412) parallel and coplanar to each other, and a third arm (413), arranged in an intermediate position and at a lower height with respect to the other two arms (411,412).

4. The device according to claim 1, wherein the gripping element (2) comprises a permanent magnet or an electromagnet.

5. The device according to claim 1, wherein the gripping element (2) is hanging from a vertically sliding flexible element (21).

6. The device according to claim 5, wherein the flexible element (21) can slide vertically due to the operation of an actuator (22) associated with one end (211) of the flexible element.

7. The device according to claim 1, wherein the gripping element (2) is movable along two horizontal directions (X,Y).

8. The device according to claim 1, wherein the slot (3) is delimited by a pair of walls (34,35) converging to each other in the downwards direction.

9. The device according to claim 1, comprising a translator (5), predisposed to translate an object (O) oriented along the slot (3) for extracting the object (O) from the slot (3) towards an operating position.

10. The device according to claim 1, wherein the gripping element (2), the slot (3), the uncoupling device (4) and a tool (T) are solidly constrained to each other.

11. A method for orienting an object (O) provided with a stem (S) and a head (H), wherein the method comprises the following steps:
collecting an object (O) by means of a magnetic gripping element (2);
positioning the object (O) above a slot (3) delimited by two edges (31,32) separated by a distance (D) which is greater than the maximum width of the stem (S) and less than the minimum width of the head (H);
activating an uncoupling device (4) in an active position, in which the uncoupling device prevents the lifting or upwards displacement of the object (O);

lifting the gripping element (2) for bringing the object (O) into contact with the uncoupling device (4) and causing the detachment of the object (O) from the gripping element (2).

12. The method according to claim 11, comprising a step of translating the object (O) along the slot (3) by means of a translator (5) until the object (O) is extracted from the slot (3) and placing the object (O) in an operating position in which the head (H) is turned upwards and accessible to a tool (T).

* * * * *